J. W. ARTHUR.
VULCANIZING APPARATUS.
APPLICATION FILED OCT. 19, 1914.
1,164,054.
Patented Dec. 14, 1915.
3 SHEETS—SHEET 1.
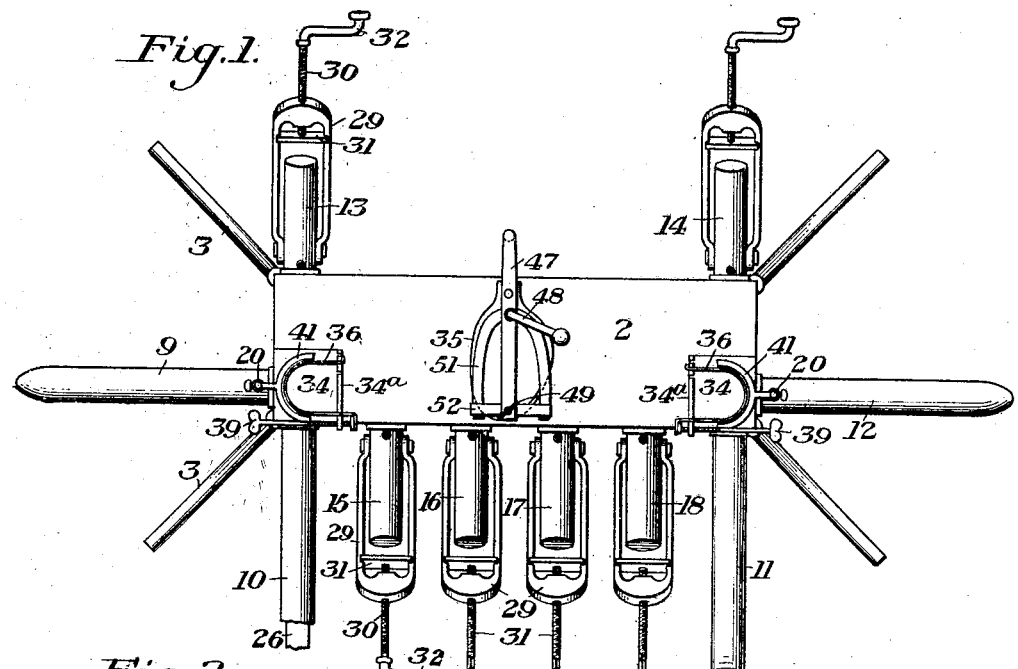
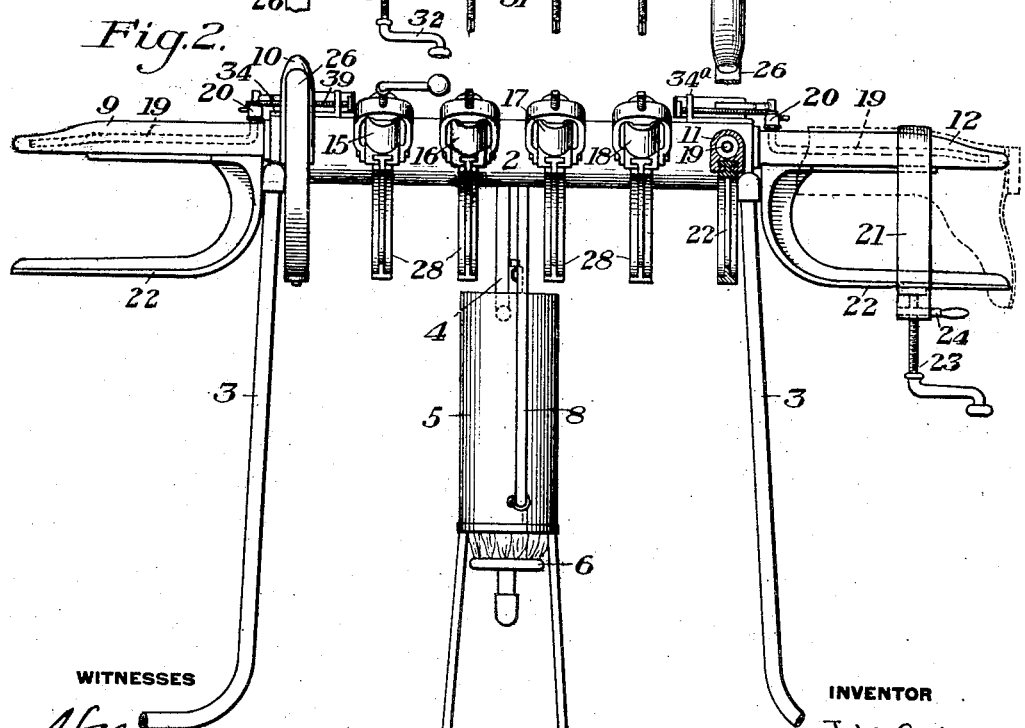

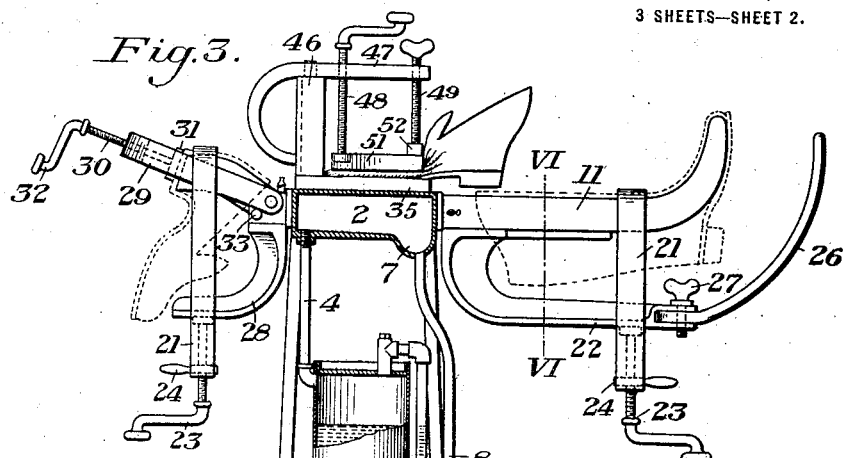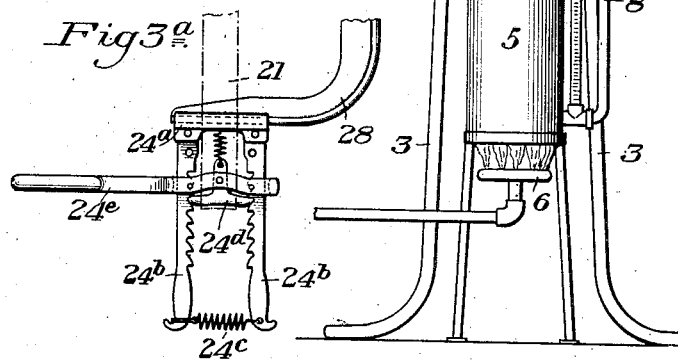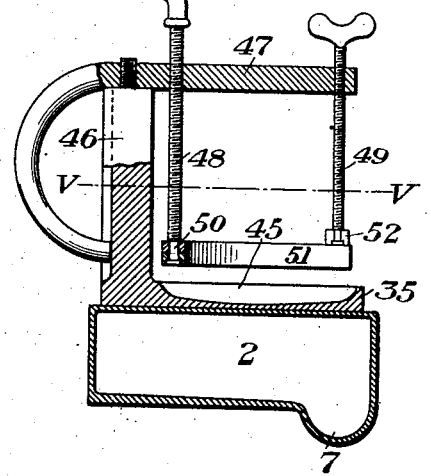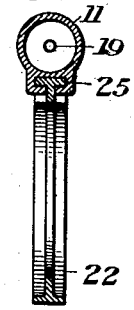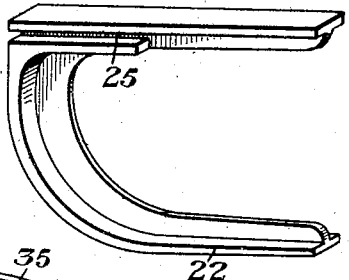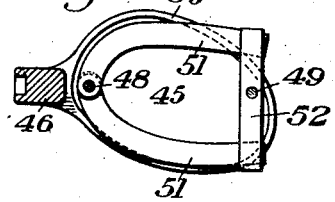

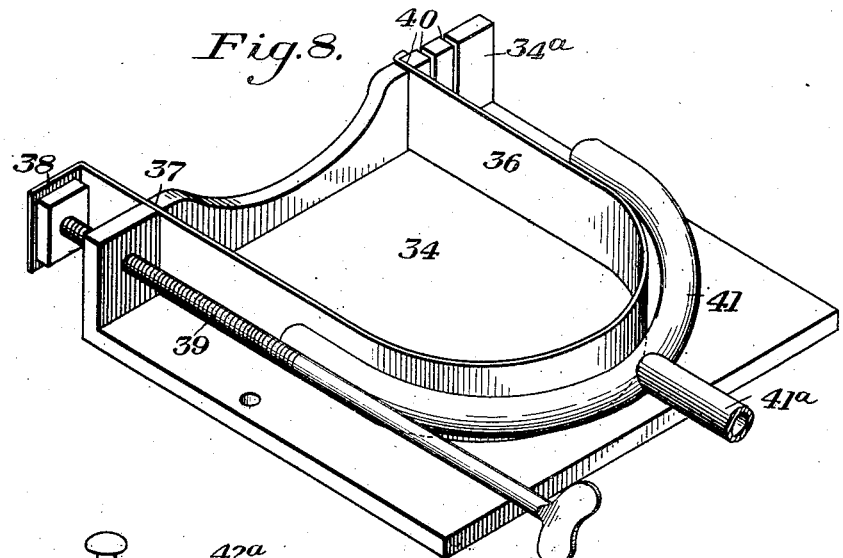
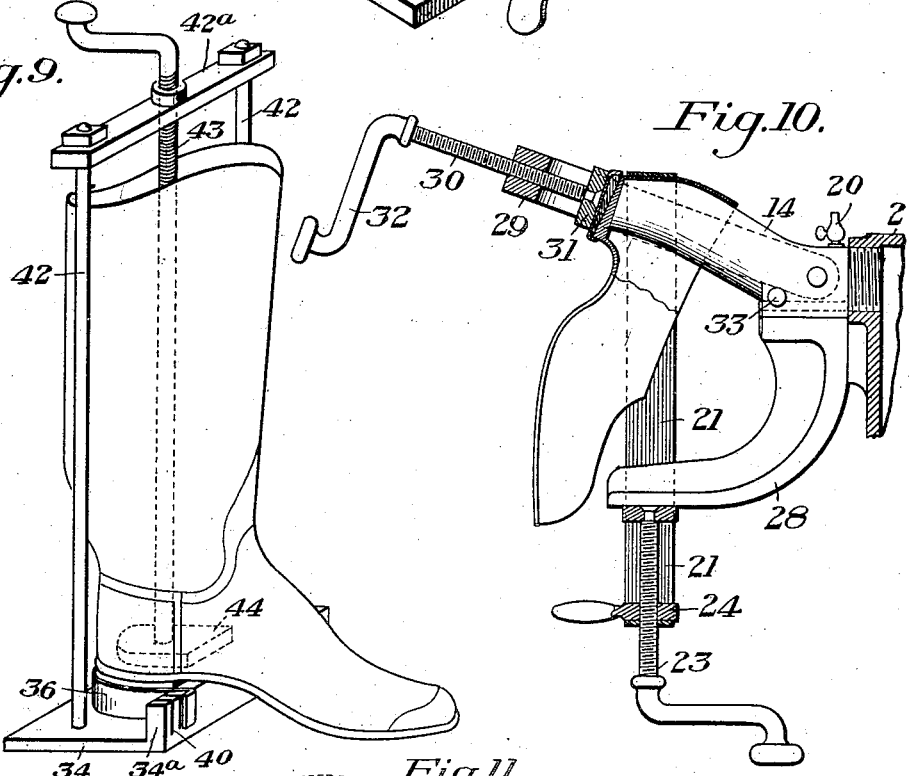
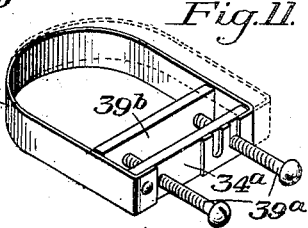

UNITED STATES PATENT OFFICE.

JAMES W. ARTHUR, OF WARREN, OHIO.

VULCANIZING APPARATUS.

1,164,054.  Specification of Letters Patent.  Patented Dec. 14, 1915.

Application filed October 19, 1914. Serial No. 867,268.

*To all whom it may concern:*

Be it known that I, JAMES W. ARTHUR, a citizen of the United States, residing at Warren, in the county of Trumbull and State of Ohio, have invented a new and useful Improvement in Vulcanizing Apparatus, of which the following is a full, clear, and exact description, reference being had to the accompanying drawings, forming part of this specification, in which—

Figure 1 is a plan view of one form of apparatus embodying my invention; Fig. 2 is a side elevation of the same; Fig. 3 is a view partly in end elevation, and partly in vertical section. Fig. 3ª is a side elevation of a modified form of clamp; Fig. 4 is a detail view in vertical section of one of the clamping devices; Fig. 5 is a section on the line V—V of Fig. 4; Fig. 6 is a section on the line VI—VI of Fig. 3; Fig. 7 is a perspective view of one of the parts; Fig. 8 is a perspective view of one of the top-heating members; Fig. 9 is a perspective view of another top-heating member showing in place the work to be vulcanized; Fig. 10 is a detail sectional view showing one of the vulcanizing horns with a shoe in place thereon; and Fig. 11 is a modified form of heel-holding device.

My invention has relation to vulcanizing apparatus, and more particularly to apparatus for use in patching and repairing rubber boots and shoes.

The present invention is an improvement upon the vulcanizing apparatus described and claimed in my pending application Serial No. 759,456, and is designed to improve the construction and arrangement of the apparatus described in that application in a number of respects, as will hereinafter fully appear.

In the accompanying drawings, the numeral 2 designates a hollow table, preferably constructed of cast metal and supported upon suitable legs 3. This table is supplied with steam by any suitable means, such as a pipe connection 4 with a boiler 5, heated by a burner 6, the boiler being shown as supported on legs 3. The table has the depression 7 in its lower portion to receive water of condensation, and which is connected with the water space of the boiler 5 by a return pipe 8.

Projecting from the sides and ends of the table is a plurality of hollow vulcanizing horns, the interiors of which communicate directly with the interior of the hollow table. These horns may be of various forms and shapes in detail, to work on different portions of boots and shoes. Thus, the longer horns 9, 10, 11 and 12 are specially adapted for use in the repairing and patching of boots, while the shorter horns 13, 14, 15, 16, 17, and 18 are more especially adapted for work on rubber shoes of various kinds. Each of the horns can be heated to the necessary temperature for vulcanizing work by the steam supplied to the interior thereof from the hollow table 2. The heating of the horns can be regulated and the heat localized by providing within each horn a small pipe 19, whose open inner end is within the outer end portion of the horn and whose opposite end is extended out through the base of the horn, and is provided with a suitable pet cock 20. These pet cocks provide means whereby the amount of air trapped within the interiors of the horns can be regulated to thereby control the heating, while operating on a boot or shoe.

The two end horns 9 and 12 are shaped to extend within a boot leg to support a boot thereon in a position to enable a patch to be applied to its rear portion. This is indicated in dotted lines in Fig. 2. The horns 10 and 11 are shown as having upwardly curved portions at their outer ends to fit within the toe portion of a boot in applying patches to the top and uppers thereof. This is indicated in dotted lines in Fig. 3. The necessary pressure is given to the patches to be applied to the boot preferably by means of endless flexible bands 21, which are passed loosely around the horns in the manner shown, and also around the bracket arms 22. One of these bracket arms is provided below each horn and so arranged with respect to the horn that the flexible bands 21 can be slid along the horns and brackets to the desired positions. The necessary adjustment is imparted to the straps 21 by means of screws 23, which have bearings at their inner ends against the bracket arms and also have a threaded engagement with nuts 24, placed within the bands or straps.

In Fig. 3ª, I have shown a ratchet jack for adjusting the bands 21, which jack is provided with a base 24ª, arranged to engage the bracket arms. Pivotally connected to this base are rack arms 24ᵇ; and 24ᶜ is a tension spring connected to the lower ends of the arms for drawing them toward each other and retaining them in connection with a ratchet dog 24ᵈ, which engages the band 21 in a manner similar to the nut 24. This ratchet dog is pivotally connected to an operating lever 24ᵉ, which is provided with pins for engaging the teeth of the rack arms 24ᵇ, to move the ratchet dog 24ᵈ downwardly when the lever is rocked.

As thus far described, the parts do not differ essentially from those described in my said application, Serial No. 759,456, although I have shown a somewhat different arrangement and disposition of the horns and have also shown the hollow table 2 separated from instead of forming a part of the boiler, as in my said application.

I will now describe in detail the features of improvement which constitute the present invention. In order to enable the bracket arms 22 to be readily removed when not in use, I provide the detachable tongue- and groove connection, such as shown at 25 (see particularly Figs. 3, 6 and 7) between the upper portions of the brackets and the under sides of the horns. I also preferably provide the brackets for each of the horns 10 and 11 with a pivoted outer end portion 26, which can be swung to any desired angular position with respect to the upwardly turned end portion of the horn and held in such position by means of the thumb screw 27. This enables the flexible band or strap 21 to be adjusted to the best position for any particular piece of work.

Each of the shorter horns 13, 14, 15, 16, 17 and 18 is also provided with a bracket arm 28, generally similar in purpose to the bracket arms 22, and forming means for imparting tension to the flexible straps used with these horns. Each of these horns is also provided with a U-shaped yoke 29, which is pivoted to the base portion of the horn and is adapted to straddle the heel portion of a boot or shoe in the manner indicated in Figs. 3 and 10. Each of the yokes 29 carries a clamping screw 30, having a clamping block 31, at its inner end, and provided with a suitable operating handle 32 at its outer end. The yokes 29 are prevented from moving downwardly beyond their proper position by means of stop pins 33. The clamping screws 30 provide means whereby the heel piece or lift can be securely clamped in proper position on the hollow heel of the rubber shoe during vulcanizing.

For the soles of boots and shoes, I provide holders for the work, which can be removably supported upon the upper surface of the table 2. In the drawings, I have shown three of these holders. The two holders 34, which are shown in Figs. 1 and 8 placed at opposite end portions of the table, are adapted for work on the solid heels of boots, while the holder 35, shown as being on the central portion of the table 2, is adapted for work on the soles. Each of the devices 34 consists of a plate removably placed on the table and having an upturned flange 34ª at its inner end.

36 is a flexible steel band, one end of which is passed through a slot 37 (see Fig. 8) in the flange 34ª, with its end bent laterally, as shown at 38. This bent end is engaged by the head of a clamping screw 39, which has a bearing in said flange and which provides means for drawing the band tightly around the heel of a boot or shoe. The other end of the band 36 is adapted to be engaged with any one of a number of parallel slots 40, these slots providing means whereby the band may be adjusted to heels of different sizes. For heating the heel portion of the band 36, I provide the U-shaped steam pipe 41 placed adjacent thereto, and which is preferably connected at its central portion by the pipe 41ª with a pet cock 20 of the adjacent vulcanizing horn. This pet cock may be a three-way cock, so that the cold air from the outer ends of the horns may be allowed to escape either to the atmosphere or into the pipe 41ª, or steam may be allowed to pass through the pipe 41ª and cut through small holes against the band 36, to vulcanize the edges of solid heels. The plate 34 also carries a support 42, having an upper transverse bar 42ª, which provides a bearing for a clamping screw 43. This screw carries at its lower end a clamping plate 44 (see Fig. 9) which is adapted to extend down within the boot and press it firmly down against said plate.

The work holder 35, shown in detail in Fig. 4, consists of a similar plate, shaped as indicated at 45, to fit the sole of a boot or shoe, and having an upwardly extending post 46, which is secured to a horizontally projecting arm 47. This arm 47 provides a bearing for two clamping screws 48 and 49. The screw 48 has a cylindrical unthreaded portion 50, at its lower end, which forms a pivotal connection for the two arms of a U-shaped adjustable clamp 51. The screw 49 at its lower end carries a cross bar 52, which rests across the free end portions of the arms of said clamp 51. The work having been properly prepared, the sole portion of the boot or shoe is placed in the recess 45, and the clamp 51 brought down upon the outer edge of the boot in the manner indicated in Fig. 3, the clamping arms 51 being adjusted to suit the particular size of boot or shoe being worked upon and the boot or shoe being filled with a last of material such as sand or powdered soapstone, to make it conform to the shape of the mold.

In Fig. 11, I have shown a modified form of holding band, comprising a flexible member 36ª, which is connected at one end to a bar 34ª. The other end of this flexible member is provided with a plurality of slots, any one of which is adapted to pass over a screw 39ª having a screw-threaded engagement with a bar 34ª. There is a second screw 39ª which also extends through the threaded opening in the bar 34ª, the ends of both screws engaging a compression plate 39ᵇ. This plate is moved forwardly by means of the screws to compress the heel between it and the band 36ª. The one end of the band 36ª is provided with a plurality of slots for engaging the screw 39ª, so that the width of the clamping member may readily be adjusted; and when adjusting the size, the proper length plate 39ᵇ is used to fill the space between the sides of the band 36ª.

The holders 34 and 35 are freely removable from the table. This enables the work to be properly fitted and spaced therein and clamped while the holders are cold and before placing them on the table 2. The workman is thus not obliged to fit and adjust the work in heated parts.

My invention provides a vulcanizing apparatus which is capable of universal use in repairing rubber boots and shoes. The different horns provide means whereby different boots and shoes may be simultaneously worked upon and the construction of the parts is such as to provide for ready and simple adjustment thereof to suit the particular work in hand. The use of the apparatus enables repairs to be readily made upon rubber boots and shoes of a character and finish not hitherto possible.

I do not desire to limit myself to the particular details of construction and arrangement of parts which I have herein described and shown, as it is obvious that these can be changed without departing from the spirit and scope of my invention as defined in the appended claims.

I claim:

1. Vulcanizing apparatus, comprising a metal table, means for heating said table, the table having a projecting upwardly curved work-supporting horn, a curved bracket arm substantially parallel with the horn and having its upwardly curved end portion pivotally connected with the body of the bracket, and a flexible work-clamping device adapted to be engaged with the bracket and with the work on the horn and to be moved along the horn and bracket into different positions, substantially as described.

2. Vulcanizing apparatus, comprising a metal table, means for heating said table, the table having a projecting horn, a bracket arm extending adjacent to the horn and detachably engaging securing means on the horn, and a flexible work-holding device movable along the horn and bracket, substantially as described.

3. Vulcanizing apparatus, comprising a hollow metallic table, means for supplying steam to the interior of the table, a hollow work-supporting horn projecting from and communicating with the interior of the table, said horn having an escape pipe for the steam, and a work support adapted to be supported upon the table adjacent to the pet cock and having a heating member connected to receive steam from the interior of the horn through the pet cock, substantially as described.

4. Vulcanizing apparatus, comprising a heating table, and a work support adapted to rest on said table, said support comprising a base plate, a flexible metallic band fixed at one end and adapted to surround the heel of a boot or shoe, means for adjustably securing the opposite end of said band and means for heating said band, substantially as described.

5. Vulcanizing apparatus, comprising a heating table and a work support adapted to rest on said table, said support comprising a base plate, a metallic band secured to the base plate and adapted to surround the heel of a boot or shoe, and means for heating said band, together with means for adjusting the band to fit different sizes of heels, substantially as described.

6. Vulcanizing apparatus, comprising a heating table, and a work support adapted to rest on said table, said support comprising a metallic band and adapted to surround the heel of a boot or shoe, and means for heating said band, together with a clamping device movable within said band toward and away from the work, substantially as described.

7. In vulcanizing apparatus, a heating table, a work-supporting device comprising a metallic band adapted to fit around the heel of a boot or shoe, means whereby said band may be adjusted to different sizes of heels, and a steam pipe adjacent to the bent portion of said band to heat the same, substantially as described.

8. Vulcanizing apparatus, comprising a heating table, a work-supporting device arranged to be supported on the table, and a clamp movable vertically toward and from the work supporting portion of said device, said clamp being of U-shape and the two members thereof having a hinge or pivot connection at the heel of the U; substantially as described.

9. Vulcanizing apparatus, comprising a heating table, and a removable work supporting and clamping device, the latter having a base portion adapted to rest on the table, a bracket-portion, vertically movable screws mounted in said bracket-portion, and an adjustable two-part clamp pivoted on the lower end portion of one of said screws and having its members separably movable about the axis of the screw, the other screw having means for engaging and exerting a downward pressure upon the free end portion of the clamp member; substantially as described.

In testimony whereof, I have hereunto set my hand.

JAMES W. ARTHUR.

Witnesses:
S. C. BILLINGS,
MISS COOPER.

Copies of this patent may be obtained for five cents each, by addressing the "Commissioner of Patents, Washington, D. C."